United States Patent
Beauchamp et al.

(10) Patent No.: US 8,500,337 B2
(45) Date of Patent: Aug. 6, 2013

(54) SEAL CLEANING AND LUBRICATING BEARING ASSEMBLY FOR A ROTATING FLOW DIVERTER

(76) Inventors: Jim Beauchamp, Red Deer (CA); Jed Wood, Sylvan Lake (CA)

( * ) Notice: Subject to any disclaimer, the term of this patent is extended or adjusted under 35 U.S.C. 154(b) by 0 days.

(21) Appl. No.: 13/350,872

(22) Filed: Jan. 16, 2012

(65) Prior Publication Data

US 2012/0177313 A1    Jul. 12, 2012

Related U.S. Application Data

(63) Continuation of application No. 12/136,872, filed on Jun. 11, 2008, now Pat. No. 8,096,711.

(60) Provisional application No. 61/016,303, filed on Dec. 21, 2007.

(51) Int. Cl.
*F16C 33/76* (2006.01)
*F16C 1/24* (2006.01)
*F16C 15/00* (2006.01)

(52) U.S. Cl.
USPC .............. 384/477; 384/15; 384/97; 277/345

(58) Field of Classification Search
USPC ............. 384/5, 15, 97, 131, 147–148, 477, 384/484–486, 607; 277/206, 323–324, 343, 277/345, 436, 530, 556, 468; 175/107, 195, 175/209, 214, 217, 232, 267; 285/236, 321, 285/322
See application file for complete search history.

(56) References Cited

U.S. PATENT DOCUMENTS

| | | | | |
|---|---|---|---|---|
| 3,400,938 | A | * | 9/1968 | Williams .................... 277/343 |
| 3,851,888 | A | * | 12/1974 | Limpson et al. ............. 277/436 |
| 4,363,357 | A | * | 12/1982 | Hunter ........................ 166/84.3 |
| 4,383,577 | A | | 5/1983 | Pruitt |
| 4,416,340 | A | | 11/1983 | Bailey |
| 4,423,776 | A | * | 1/1984 | Wagoner et al. ............. 175/195 |
| 4,480,703 | A | * | 11/1984 | Garrett .......................... 175/195 |
| 4,531,591 | A | * | 7/1985 | Johnston ......................... 175/57 |
| 4,618,154 | A | * | 10/1986 | Freudenthal .................. 277/562 |
| 4,706,970 | A | * | 11/1987 | Ramirez ....................... 277/556 |
| 4,739,997 | A | * | 4/1988 | Smetana ....................... 384/131 |
| 4,754,820 | A | * | 7/1988 | Watts et al. ................... 175/195 |
| 4,783,084 | A | * | 11/1988 | Biffle ............................ 277/324 |
| 4,844,511 | A | * | 7/1989 | Galle et al. ................... 285/308 |
| 5,020,635 | A | | 6/1991 | Lunn |
| 5,211,099 | A | * | 5/1993 | Grosspietsch et al. ........ 277/439 |

(Continued)

OTHER PUBLICATIONS

Smith Services Hold 2500 Rotating Control Device Brochure (c) 2004.

*Primary Examiner* — Marcus Charles
(74) *Attorney, Agent, or Firm* — David Cate; David J. Smith

(57) ABSTRACT

A rotating flow diverter has a lubricated sealed bearing assembly for isolating bearing elements from wellbore fluids under pressure. The sealed bearing assembly is supported between an outer bearing housing and an axially rotatable quill. The bearing assembly further has bearing elements with a bearing lubricant under pressure and a seal assembly. The seal assembly has at least one sealing element which comprises a body, the body having an outer peripheral wall, an inner sealing surface having a plurality of sealing lips and an annular cavity, and a loading ring for compressionally fitting within the annular cavity to urge the sealing surface radially inwardly for sealing engagement with tubulars.

17 Claims, 13 Drawing Sheets

U.S. PATENT DOCUMENTS

| | | | |
|---|---|---|---|
| 5,348,107 A * | 9/1994 | Bailey et al. | 175/162 |
| 5,609,368 A * | 3/1997 | Maki et al. | 285/12 |
| 5,647,444 A | 7/1997 | Williams | |
| 5,662,181 A * | 9/1997 | Williams et al. | 175/195 |
| 5,823,541 A * | 10/1998 | Dietle et al. | 277/320 |
| 6,016,880 A | 1/2000 | Hall | |
| 6,138,774 A * | 10/2000 | Bourgoyne et al. | 175/7 |
| 6,202,762 B1 * | 3/2001 | Fehr et al. | 175/107 |
| 6,244,359 B1 | 6/2001 | Bridges | |
| 6,293,343 B1 * | 9/2001 | Pallini et al. | 166/345 |
| 6,354,385 B1 * | 3/2002 | Ford et al. | 175/195 |
| 6,554,324 B1 * | 4/2003 | Herman | 285/322 |
| 6,725,951 B2 * | 4/2004 | Looper | 175/195 |
| 7,040,394 B2 | 5/2006 | Bailey | |
| 7,308,954 B2 | 12/2007 | Martin-Marshall | |
| 7,549,487 B2 * | 6/2009 | LeBlanc et al. | 384/97 |
| 2005/0133266 A1 * | 6/2005 | May et al. | 175/57 |

* cited by examiner

Fig. 8A
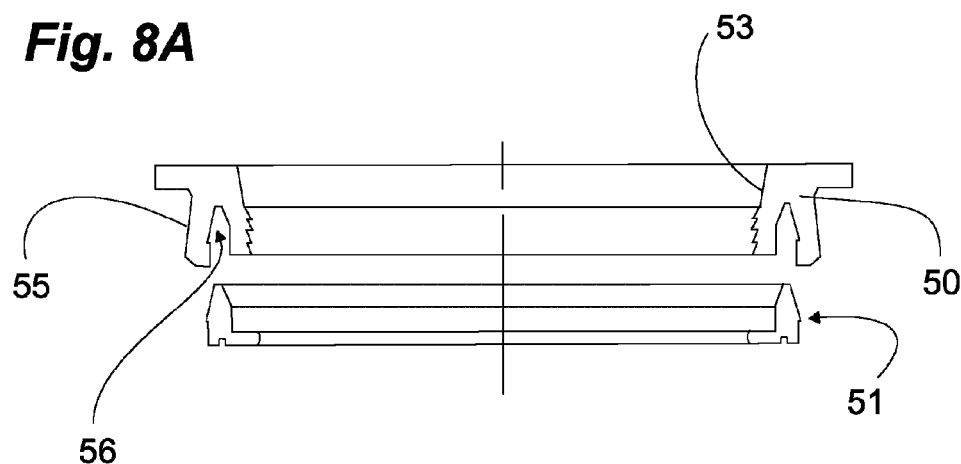
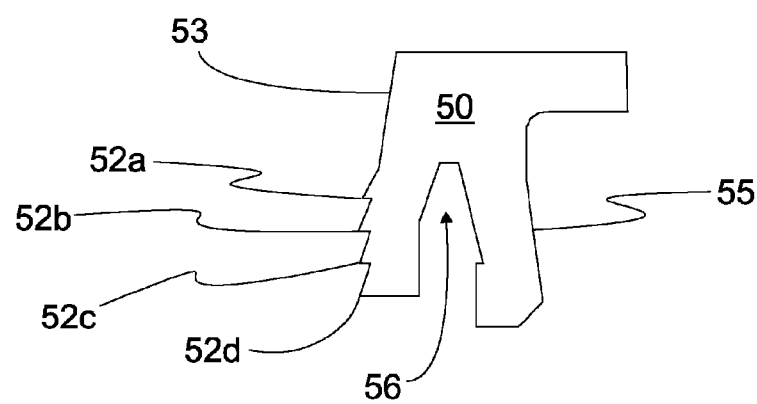
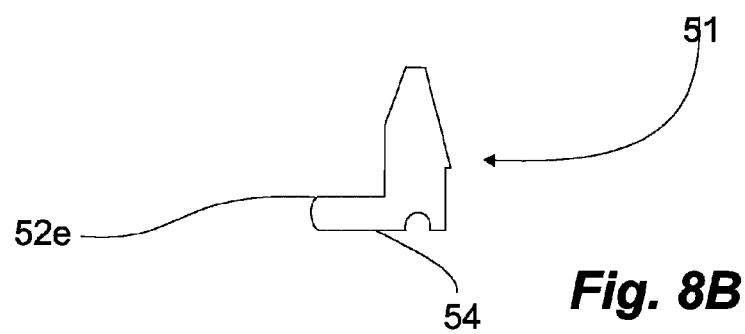
Fig. 8B

SEAL CLEANING AND LUBRICATING BEARING ASSEMBLY FOR A ROTATING FLOW DIVERTER

CROSS REFERENCE TO RELATED APPLICATION

This patent application is a continuation of and claims priority upon co-pending US Non-Provisional patent application entitled "Seal Cleaning and Lubricating Bearing Assembly for a Rotating Flow Diverter," filed on Jun. 11, 2008, Ser. No. 12/136,872, now U.S. Pat. No. 8,096,711, the entirety of which is incorporated herein by reference. This application-also claims the priority of U.S. Provisional Patent application Ser. No. 61/016,303, filed on Dec. 21, 2007, the entirety of which is incorporated herein by reference.

FIELD OF THE INVENTION

Embodiments of the invention related to wellhead apparatus for well control and more particularly to the lubrication, cleaning, cooling and preservation of seals of apparatus used to control and divert drilling and wellbore fluids and gases, and produced gas and solids during drilling and other operations.

BACKGROUND OF THE INVENTION

In the oil and gas industry it is conventional to mount a rotating blowout preventer or rotating flow head (also known as a rotating flow diverter or rotating flow controller) at the top of a blowout preventer (BOP) stack. The rotating flow head serves multiple purposes including sealing off tubulars moving in an out of the wellbore and accommodating rotation of same. Tubulars can include a kelly, pipe or other drill string component when a top drive is used. The rotating flow head diverts fluids such as drilling mud, surface injected air or gas and produced wellbore fluids into a recirculating or recovery mud line. Typical in-service time numbers in the tens to low hundreds of hours before some part of the operation requires service or other attention including drill bit replacement or other downhole equipment such as motors, turbines and measurement while drilling systems. It is desirable that a rotating flow head last as long as other components and not be the reason operations are interrupted and result in non-productive time (NPT).

As disclosed in U.S. Pat. No. 5,662,181 to Williams et al. and U.S. Pat. No. 6,244,359 to Bridges et al., a variety of means are provided to lubricate the bearing assembly of a rotating flow head. Conventionally, most lubrication means require that a lubricant be injected or pumped into an annulus which houses the bearings to lubricate the bearings. Such lubrication means may require elaborate hydraulic mechanisms and seal arrangements to ensure adequate lubrication.

If the ability to maintain adequate lubrication of the bearings is compromised, the bearings will fail quickly resulting in NPT.

One of the most common sources of premature failure of bearings in current rotating flow head technology is the failure of a seal or seal stack that isolates the wellbore environment from entering the bearing assembly housing.

Reducing operational NPT by maximizing the longevity of the bearings is a key objective for all companies involved in the provision of rotating flow diverter equipment.

There is a need for a sealing system of the bearing assembly which is simple and effective to maximize seal function and prevent premature wear and failure of the bearings.

SUMMARY OF THE INVENTION

A rotating flow diverter of the present invention comprises a seal system for lubricating, cleaning of a seal assembly and the reduction of a pressure differential across the seal assembly to improve the longevity of the rotating flow head bearings and sealing elements, and a unique assembly for providing a low profile rotating flow head.

In a broad aspect of the invention a lubricated sealed bearing assembly for a rotating blowout preventer for tubulars is disclosed. The sealed bearing assembly is adapted for isolating bearings from wellbore fluids under pressure, the assembly having an outer cylindrical or bearing housing and an axially rotatable inner cylindrical tubular adapted for the passage of tubulars, bearing elements having a first lubricant under pressure, positioned in an annular bearing assembly space, for radially and axially supporting the inner cylindrical tubular within the outer housing, and a seal assembly positioned in the annular bearing assembly space, downhole from the bearing elements, isolating the bearing elements from the wellbore fluids.

The seal assembly has at least one sealing element having a body with an outer peripheral wall supported in an outer housing, an inner sealing surface adapted to engage tubulars, an annular cavity, and a loading ring for compressionally fitting within the annular cavity for providing a radial force to urge the body to expand radially inwardly to engage the inner sealing surface with the tubulars for sealing thereto.

In another broad aspect of the invention, the seal assembly has at least two sealing elements forming at least one seal interface therebetween, and a source for providing a second lubricant under pressure to the at least one seal interface between the at least two sealing elements to reduce a pressure differential across the at least two sealing elements to the wellbore fluids.

BRIEF DESCRIPTION OF THE FIGURES

FIG. 8A is an exploded, side cross-sectional view of a two-part lip seal;

FIG. 8B is a partial, exploded view of a cross-section of the lip seal of FIG. 8A;

DETAILED DESCRIPTION OF THE PREFERRED EMBODIMENTS

A rotary flow diverter generally comprises a stationary housing adapted for incorporation into a wellhead and a rotating quill portion for establishing a seal to a tubular such as tubing or drill pipe. The quill is rotatably and axially supported by an internal rotating assembly comprising bearings and a seal assembly for isolating the bearings from well fluids. In one embodiment, the seal assembly is energized with fluid and maintained at a pressure intermediate the wellbore fluids pressure and atmospheric for reducing the pressure differential across sealing elements and in another embodiment, the seal energizing fluid is a lubricating fluid and seal assembly can be flushed to remove debris, both of which improve seal and bearing life.

Figure 1:
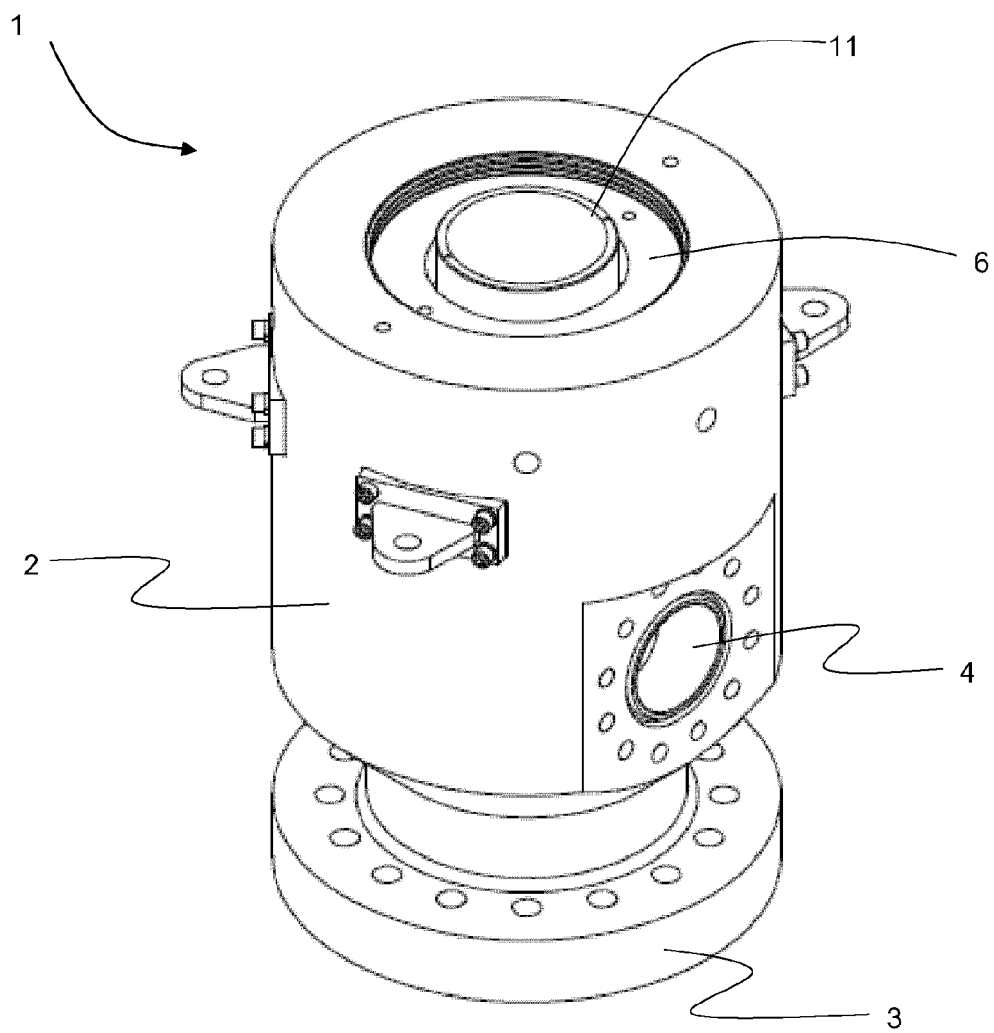
FIG. 1 is a perspective view of an embodiment of the present invention illustrating various external components.
Figure 2:
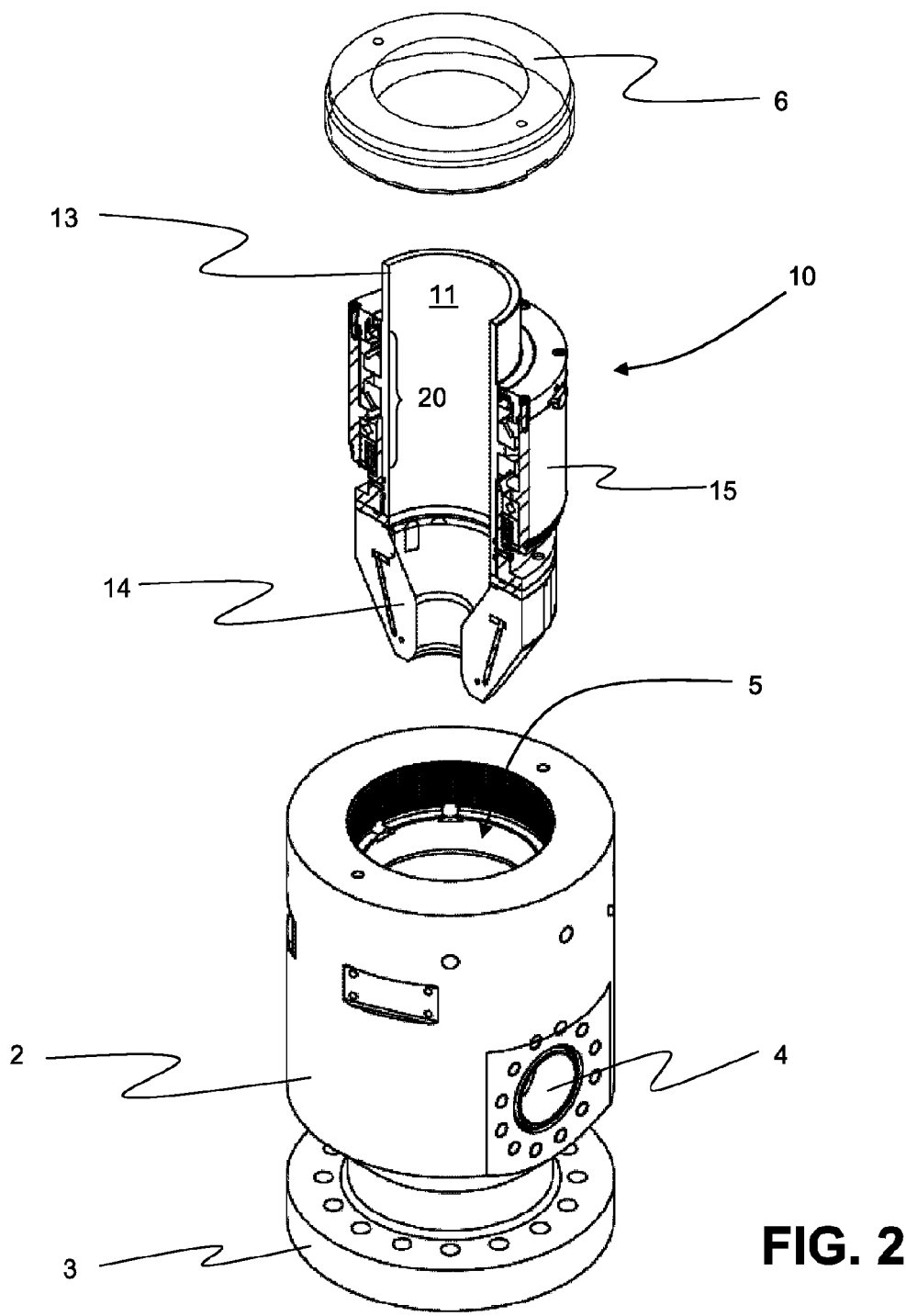
FIG. 2 is an exploded view of FIG. 1 illustrating the internal bearing and stripper assembly.

More specifically, as shown in FIG. 1, a rotating flow diverter 1 comprises a stationary housing 2 adapted at a lower end by a flange connection 3, to operatively connect with a wellhead or blow out preventer (not shown). In operation for diverting and recovering fluids from the wellbore, the stationary housing 2 can be fit with one or more outlets 4 along a side portion of the housing 2 for the discharge of well fluids.

With reference to FIGS. 2-5, the stationary housing 2 has a bore 5 fit with an internal assembly including a quill 11 and a sealed bearing assembly 20. The quill 11 comprises a tubular shaft 13 having an elastomeric stripper element 14 supported at a downhole end of the tubular shaft 13. An annular space 12 is formed between the stationary housing 2 and the quill shaft 13. The sealed bearing assembly 20 is positioned in the annular space 12 for axially and rotationally supporting the quill 11 in the stationary housing 2. The quill 11 and sealed bearing assembly 20 are retained within the stationary housing 2 by a retainer cap 6.

Figure 4:
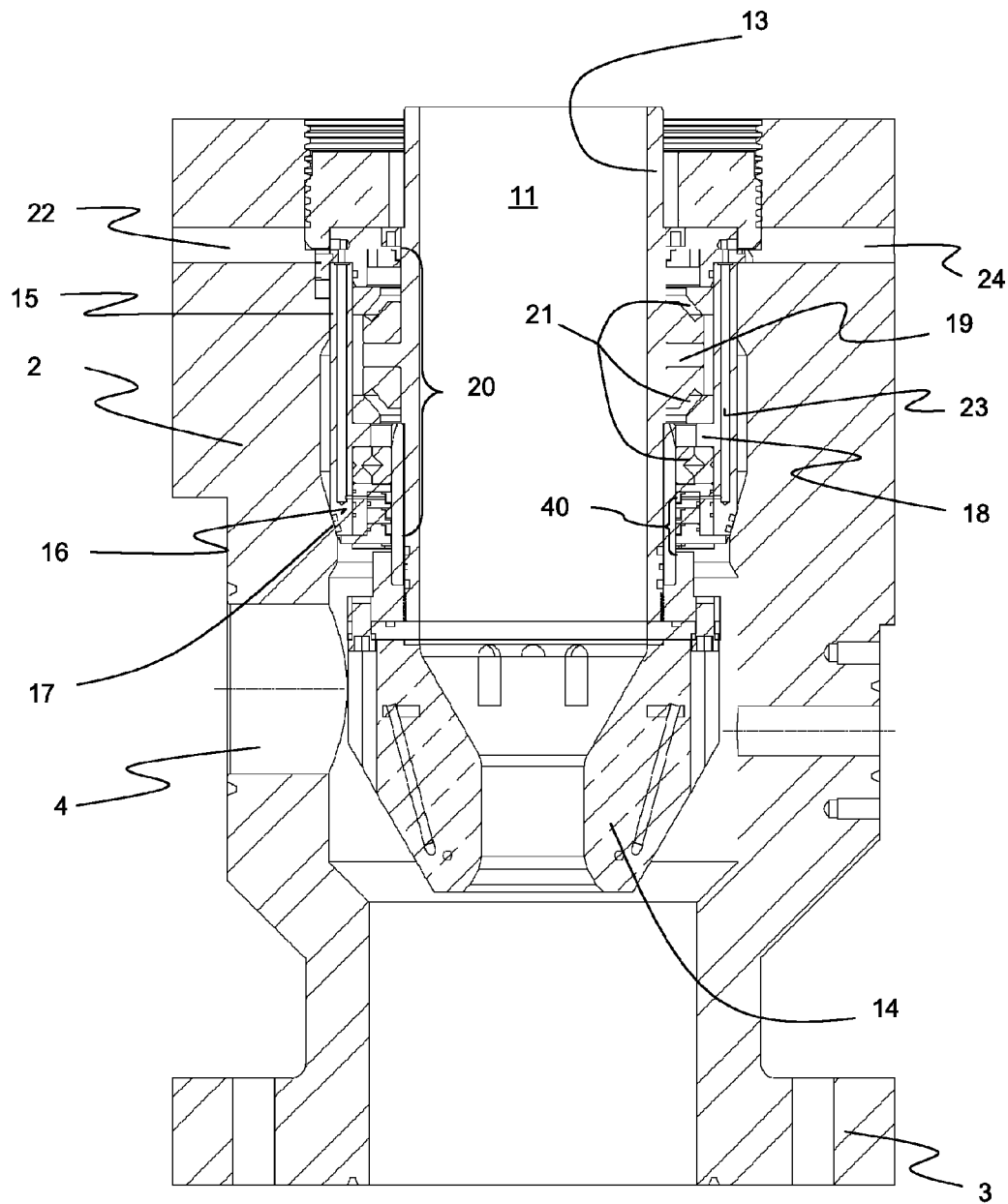
FIG. 4 is a cross-sectional side view of FIG. 3.
Figure 5:
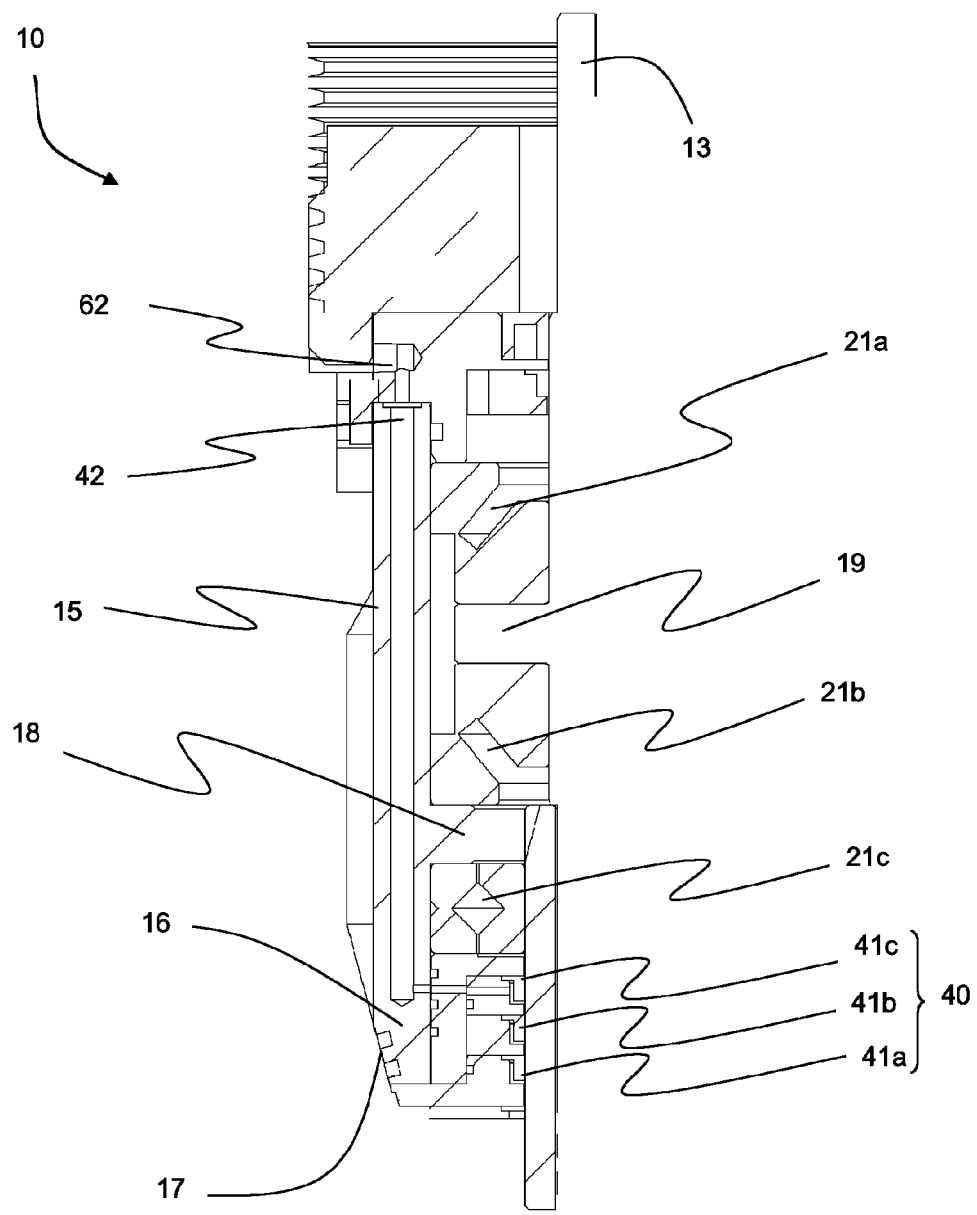
FIG. 5 is an enlarged view of a one-half section the sealed bearing assembly of FIG. 4 further illustrating the individual sealing elements, and individual bearing elements.

The sealed bearing assembly 20, can be releasably fit as a module 10 into the stationary housing 2 of the rotating flow diverter 1. The module 10 retains bearings 21 and a seal assembly 40 for replacement as a unit and comprises an outer bearing housing 15. The outer bearing housing 15 has a tapered lower end 16 (as shown in FIGS. 4 and 5) which is supported upon a lower shoulder 17 in the bore 5 of the stationary housing 2 and retained therein by the retaining cap 6. The retaining cap 6 threadably secures into the bore 5 of the stationary housing 2, engaging an upper end of the module 10 for securing the module 10 therein and obviating the need for conventional and tall clamping arrangements (not shown).

As shown in FIG. 4, the outer bearing housing 15 has a radially inward shoulder 18 and the quill shaft 13 has a radially outward shoulder 19 which cooperate with the sealed bearing assembly 20 to axially and rotationally support the quill 11 in the outer bearing housing 15. The stripper element 14 is bolted to a downhole portion of the quill shaft 13. An annular space formed between the quill 11 and the stationary housing 2 is exposed to the wellbore fluids.

With reference to FIG. 5, the module 10 houses bearings elements 21a, 21b, 21c and seal assembly 40. The seal assembly isolates wellbore fluids from the bearings elements 21a, 21b, 21c. The seal assembly 40 can comprise one or more seal elements 41a, 41b, 41c . . . . The bearing elements 21a, 21b, 21c are selected from heavy duty bearings for rotationally and axially supporting loads resulting from wellbore pressure and tubular movement. The bearing elements 21a, 21b, 21c between the outer bearing housing 15 and the quill shaft 13 are provided with a first lubricant. The first lubricant can be circulated for cooling the bearings and surrounding area.

As shown in FIG. 5, the outer bearing housing 15 and the quill shaft 13 define an annular bearing assembly space therebetween for supporting bearing elements 21a, 21b, 21c and seal assembly 40. The quill shaft 13 is axially and radially supported within the outer bearing housing 15 by bearing elements 21a, 21b, 21c. Downhole from the bearing elements 21a, 21b, 21c, is the seal assembly 40.

In one embodiment, the bearing elements 21a, 21b, 21c, are in fluid communication with a bearing lubricant passageway 23 (shown in FIG. 8A) for directing a bearing lubricant under pressure to the bearing elements 21a, 21b, 21c. The bearing lubricant passageway 23 forms a discrete and independent bearing fluid system. The bearing lubricant can be continuously flushed through the bearing fluid system to lubricate and cool the bearing elements 21a, 21b, 21c. A heat exchanger can be provided to cool the bearing lubricant.

The seal assembly 40 isolates the bearing elements 21a, 21b, 21c from wellbore fluids. The seal assembly 40 is in fluid communication with a seal lubricant passageway 42 for directing a seal lubricant under pressure to the seal assembly 40 to form a seal fluid system which is discrete and independent from the bearing lubricant passageway 23. The seal lubricant can be continuously or periodically flushed to lubricate and remove accumulated debris from within the seal assembly 40.

In the embodiment shown, the seal assembly 40 can comprise three sealing elements 41a, 41b, 41c. The longevity of the seal assembly 40 is further aided using at least a second lubricant under pressure directed to the seal assembly 40. The second lubricant can be flushed continuously or periodically for removing any accumulated debris within the seal assembly 40.

Generally, as shown in FIG. 5, a seal lubricant inlet port 62 is in fluid communication with a seal lubricant passageway 42 in the outer bearing housing 15 for access to the annular bearing assembly space. An outlet port (not shown) positioned about diametrically opposite to the inlet port 62 can enable flow of lubricant for cleaning and lubrication. One or more seal lubricant passageways 42 are formed in the outer bearing housing 15 (FIGS. 7A, 7B and 7C) for directing seal lubricant under pressure to one or more axial locations along the annular bearing assembly space, such to the one or more of the sealing elements 41a, 41b, 41c.

In one embodiment, the seal lubricant can be pressurized sufficiently to introduce the seal lubricant to the lubricant passageways 42. In another embodiment, the seal lubricant can be pressurized sufficiently to increase a pressure of the seal lubricant at one or more axial locations to reduce a pressure differential across the one or more sealing elements 41a, 41b.

Figure 6A:
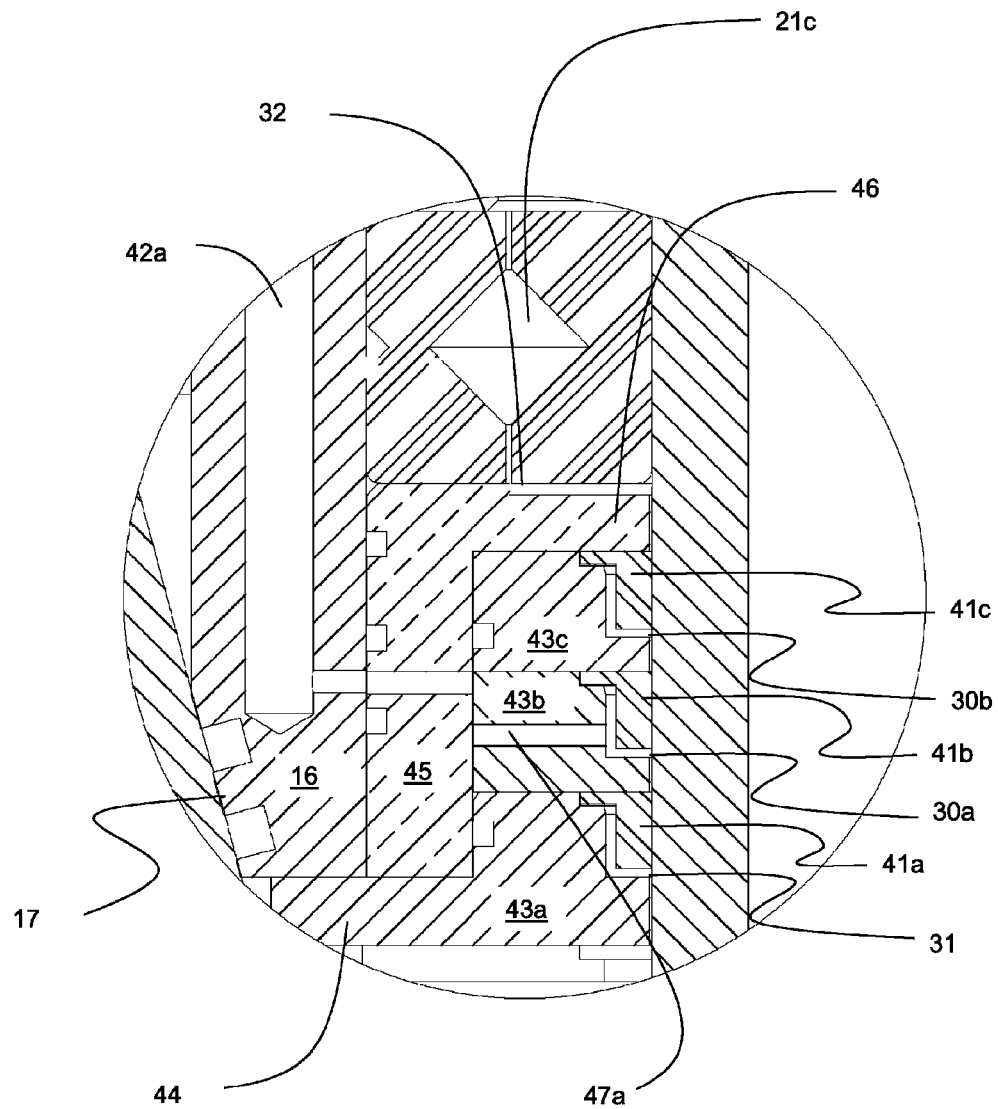
FIG. 6A is a cross sectional view of an embodiment of the present invention illustrating a lubricant passageway in fluid communication with the seal interface between an upper and intermediate sealing elements of the seal assembly.
Figure 6B:
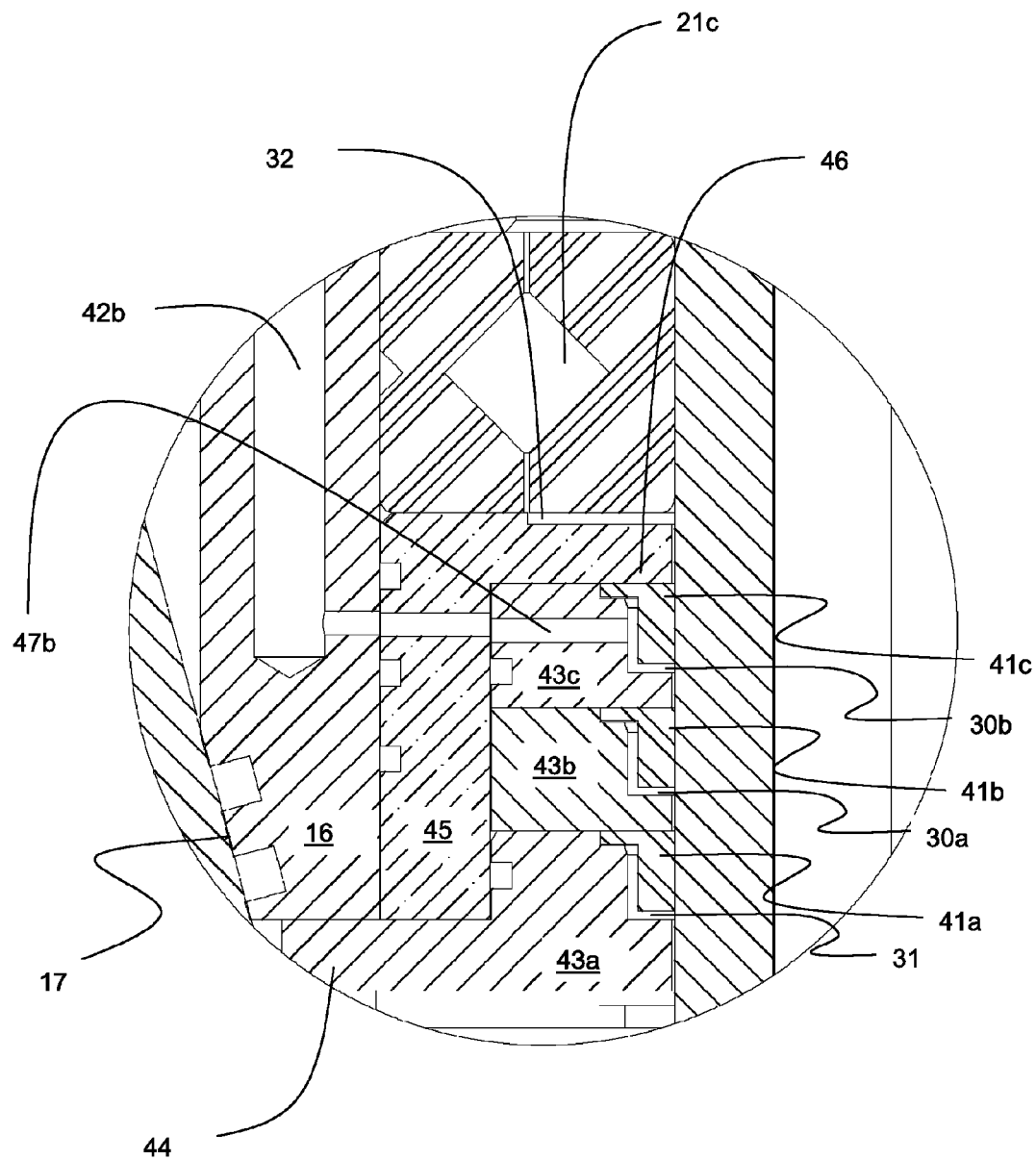
FIG. 6B is a cross sectional view of an embodiment of the present invention illustrating a lubricant passageway in fluid communication with the seal interface of an upper sealing element of the seal assembly.

As best seen in FIGS. 6A and 6B, in one embodiment, the seal assembly 40 has three elastomeric sealing elements 41a, 41b, 41c. Each elastomeric sealing element 41a, 41b, 41c is supported by a corresponding seal backer ring 43a, 43b, 43c which are in turn supported in the outer bearing housing 15. The backer ring 43a of the lowermost sealing element 41a can be formed by ring 44 which further assists in retaining all the backer rings 43a, 43b, 43c and seal elements 41a, 41b and 41c within the lower end 16 of the outer bearing housing.

The seal assembly 40 is supported within a seal sleeve 45, the upper end of the sleeve having a radially inward shoulder 46 bearing against the lower bearing element 21c. The seal sleeve 45 has a lower end supported in the outer bearing housing 15 by the seal retaining ring 44. The sealing elements 41a, 41b, 41c are sandwiched between the upper radial shoulder 46 and the seal retaining ring 44 therebelow.

The lower sealing element 41a is supported in a first seal backer ring 43a. The lower sealing element 41a has an uphole surface that seals against the second seal backer ring 43b. The intermediate sealing element 41b is supported in a second seal backer ring 43b and the uppermost sealing element 41c is supported in a third seal backer ring 43c. The uppermost sealing element 41c has an uphole surface that seals against the radial shoulder 46 of the seal sleeve 45.

A first sealing interface 30a is formed between an uphole surface of the lowermost sealing element 41a and a downhole surface of the second seal backer 43b of the intermediate sealing element 41b. A first lubricant passageway 42a, in the outer bearing housing 15, is in fluid communication with the first sealing interface 30a. The intermediate seal backer 43b can be fit with a connecting passageway 47a which extends additionally through the seal sleeve 45, for directing a seal lubricant from the fluid passageway 42a under pressure to the first sealing interface 30a.

Accordingly, when the pressurized seal lubricant enters the first seal interface 30a, the seal lubricant applies a pressure between the first and second sealing elements 41a, 41b and thereby reduces the pressure differential across the first sealing element 41a and the wellbore fluids. The seal lubricant further lubricates sealing elements 41a and 41b. The seal lubricant can also be continuously or periodically flushed to remove accumulated debris from sealing element 41a and between first and second sealing elements 41a, 41b.

In the three sealing element embodiment shown in FIG. 6B, a second sealing interface 30b is formed between third and second sealing elements 41c, 41b. A second seal lubricant passageway 42b is in fluid communication with the second sealing interface 30b. Seal backer 43c is fit with a connecting passageway 47b in fluid communication with the second lubricant passageway 42b through the seal sleeve 45, for directing seal lubricant under pressure to the second sealing interface 30b.

The first and second lubricant passageways 42a, 42b provide seal lubricant under pressure for lubricating the sealing elements 41a, 41b, 41c and cleaning of the sealing interfaces 30a, 30b. The seal lubricant can also provide a pressure uphole to each of the lowermost sealing element 41a and the intermediate sealing element 41b to help reduce the pressure differential across each of the lowermost sealing element 41a and the intermediate sealing element 41b. Optionally, continuous or periodic flushing of the sealing interfaces 31a and 30b, removes any accumulated debris from the seal interfaces 30a, 30b. In embodiments of the invention, the first and second lubricant passageways 42a, 42b can be maintained independent from each other and be energized with different fluid pressures. In other embodiments, the first and second lubricant passageways 42a, 42b can be fluidly coupled and be energized with the same fluid pressure.

A downhole surface of the lowermost sealing element 41a forms a wellbore interface 31 against the wellbore fluids.

Figure 7A:
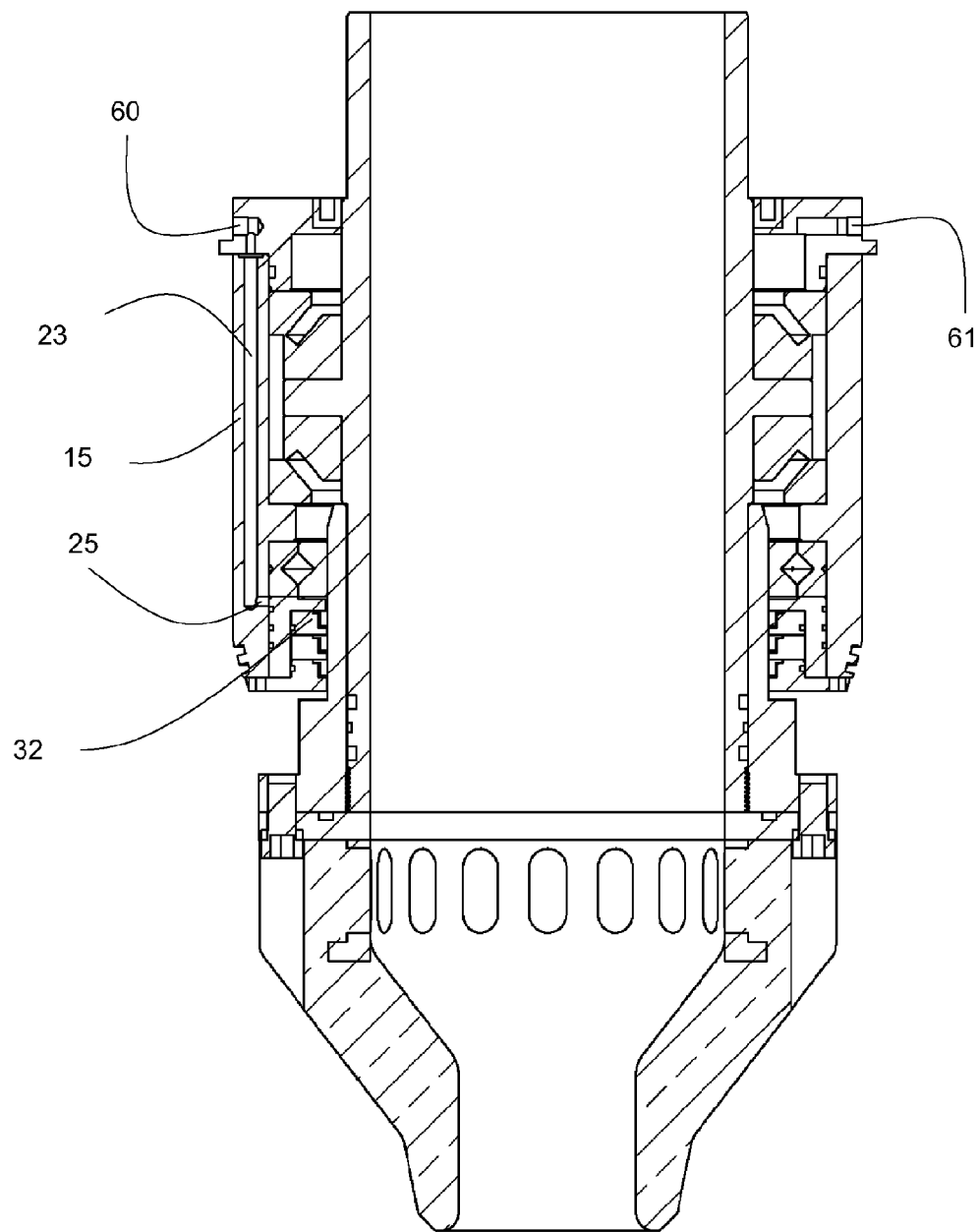
FIG. 7A is a cross sectional view of an embodiment of the present invention showing the internal assembly including a bearing housing, seal assembly and stripper element, illustrating a bearing lubricant passageway in fluid communication with a bearing interface.
Figure 7B:
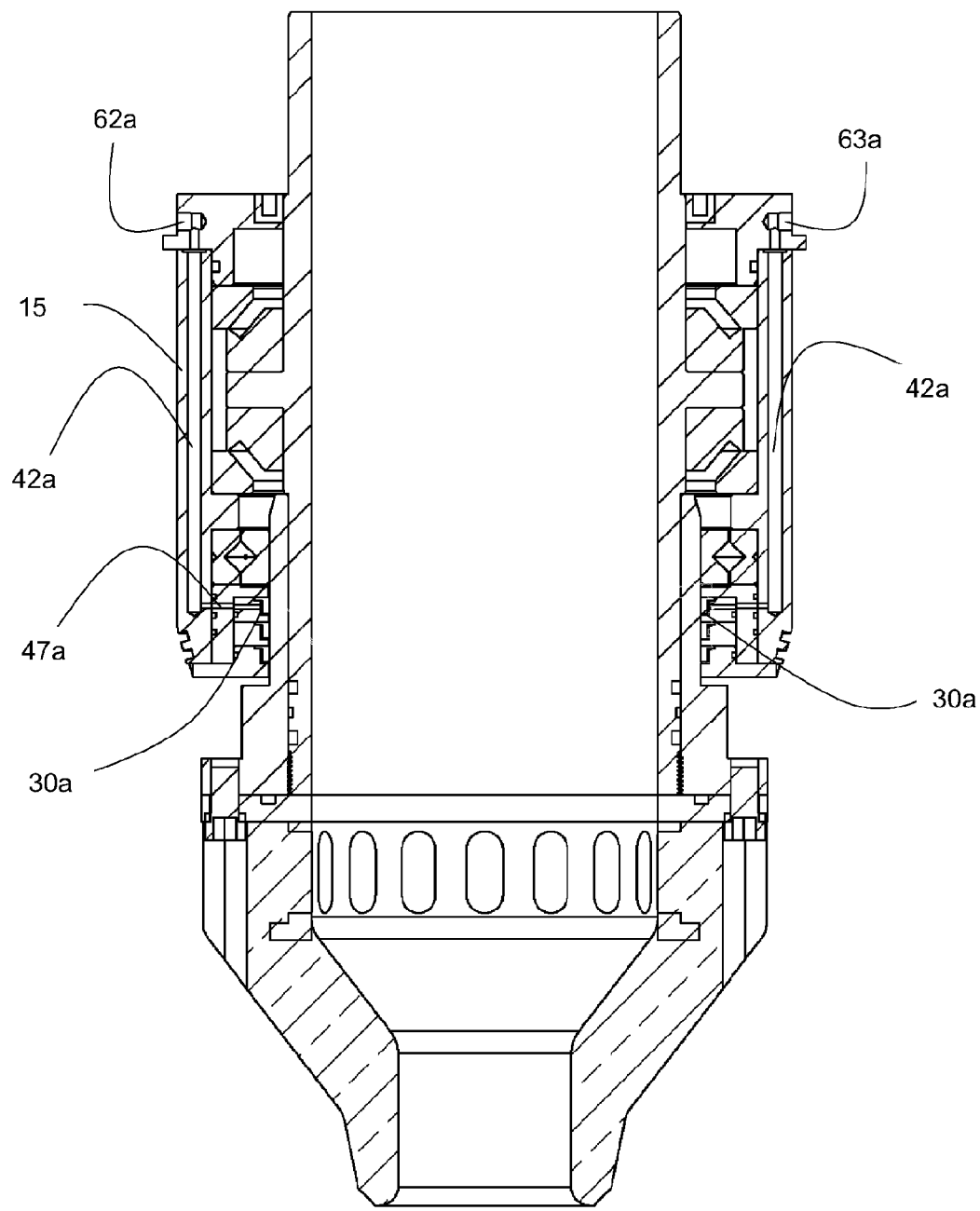
FIG. 7B is a cross sectional view of an embodiment of the present invention showing the internal assembly including a bearing housing, seal assembly and stripper element, illustrating a lubricant passageway in fluid communication with a seal interface between the upper and intermediate sealing elements.
Figure 7C:
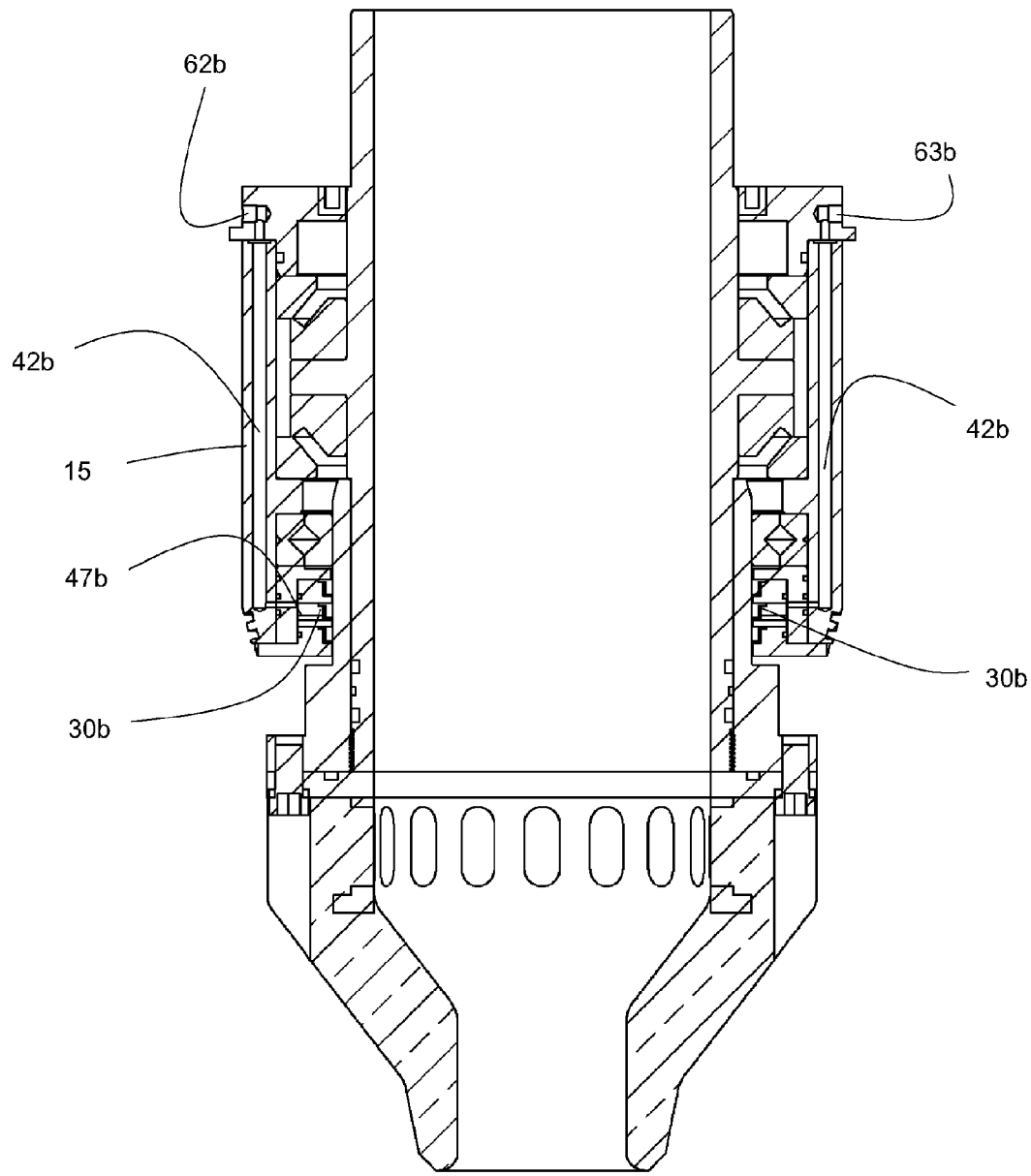
FIG. 7C is a cross sectional view of an embodiment of the present invention showing the internal assembly including a bearing housing, seal assembly and stripper element, illustrating a lubricant passageway in fluid communication with a seal interface between the intermediate and lower sealing elements.

With references to FIGS. 7A-7C, the bearing interface 32 and seal interfaces 30a, 30b are shown to be in fluid communication with their own corresponding lubricant passageways 23, 42a, and 42b. For example, in the embodiment shown in FIG. 7A, the bearing interface 32 is in fluid communication with bearing lubricant passageway 23. In FIG. 7B, the seal lubricant passageways 42a are in fluid communication with seal interface 30a, and similarly in FIG. 7C, lubricant passageways 42b are in fluid communication with seal interface 30b.

The bearing lubricant passageways 23 are provided with an inlet port 60 and an outlet port 61 while the seal lubricant passageways 42a, 42b are provided with an inlet port 62a, 62b and an outlet port 63a, 63b to enable independent flows of the bearing and seal lubricants. Seal lubricant passageways 42a, 42b for each seal interface 30a, 30b are in fluid communication with their own corresponding connecting passageway 47a, 47b (FIGS. 6A and 6B), allowing for independent control over each seal interface 30a, 30b.

For example, as shown in FIG. 7A, the bearing lubricant passageway 23 is in fluid communication with bearing interface 32 via a bearing connecting passageway 25. The bearing lubricant passageway 23 is in fluid communication with a corresponding inlet port 60 and a corresponding outlet port 61, forming a discrete fluid system that is independent of other fluid systems.

Similarly, as shown in FIG. 7B, lubricant passageway 42a, in fluid communication with seal interface 30a via the connecting passageway 47a, is in fluid communication with its corresponding inlet port 62a and outlet port 63a, forming another discrete and independent fluid system.

FIG. 7C illustrates another discrete and independent fluid system with lubricant passageway way 42b in fluid communication with seal interface 30b via connecting passageway 47b. Similar to the above fluid systems, lubricant passageway 42b is also in fluid communication with a corresponding inlet port 62b and outlet port 63b.

In another embodiment, the lubricant passageways 42a, 42b can be a common annular passageway, formed in the outer bearing housing, allowing for common control of the seal interfaces 30a, 30b.

In one embodiment, the rotating flow diverter of the present invention can be connected uphole to a blow out preventer. A seal lubricant is directed to each of the seal interfaces 30a, 30b at a pressure that is appropriate for the operational conditions observed for that particular wellhead. The seal lubricant can be charged to an appropriate pressure, which can be greater than or lower than the pressure of the wellbore fluids. The seal lubricant under pressure lubricates as well as reduces the pressure differential across each of the sealing elements. The seal lubricant can be continuously or periodically flushed to remove any accumulated debris within the seal interfaces 30a, 30b.

If the operational conditions warrant a continuous flushing of the seal lubricant, a pump can be fluidly connected to corresponding inlets and outlets to a seal lubricant reservoir. If continuous flushing is not necessary, and periodic flushing of the seal lubricant is sufficient, displacement of the used seal lubricant can be accomplished with a simple hand pump to provide sufficient force to eject used lubricant and inject fresh lubricant to the seal interfaces 30a, 30b. For these purposes, a single port can be used to both introduce clean seal lubricant and release used seal lubricant.

In another embodiment, an operator, depending on the wellbore pressure conditions, would determine an appropriate pressure differential of lubricant to be applied across each sealing element, if any. The determination of the optimal pressure differential across each interface and the lubricant circulation rate can be based upon one or more of the actual wellbore pressure, the temperature of the lubricant between the sealing elements and empirical results derived from the operational conditions observed by the operator for that particular wellhead.

Figure 3:
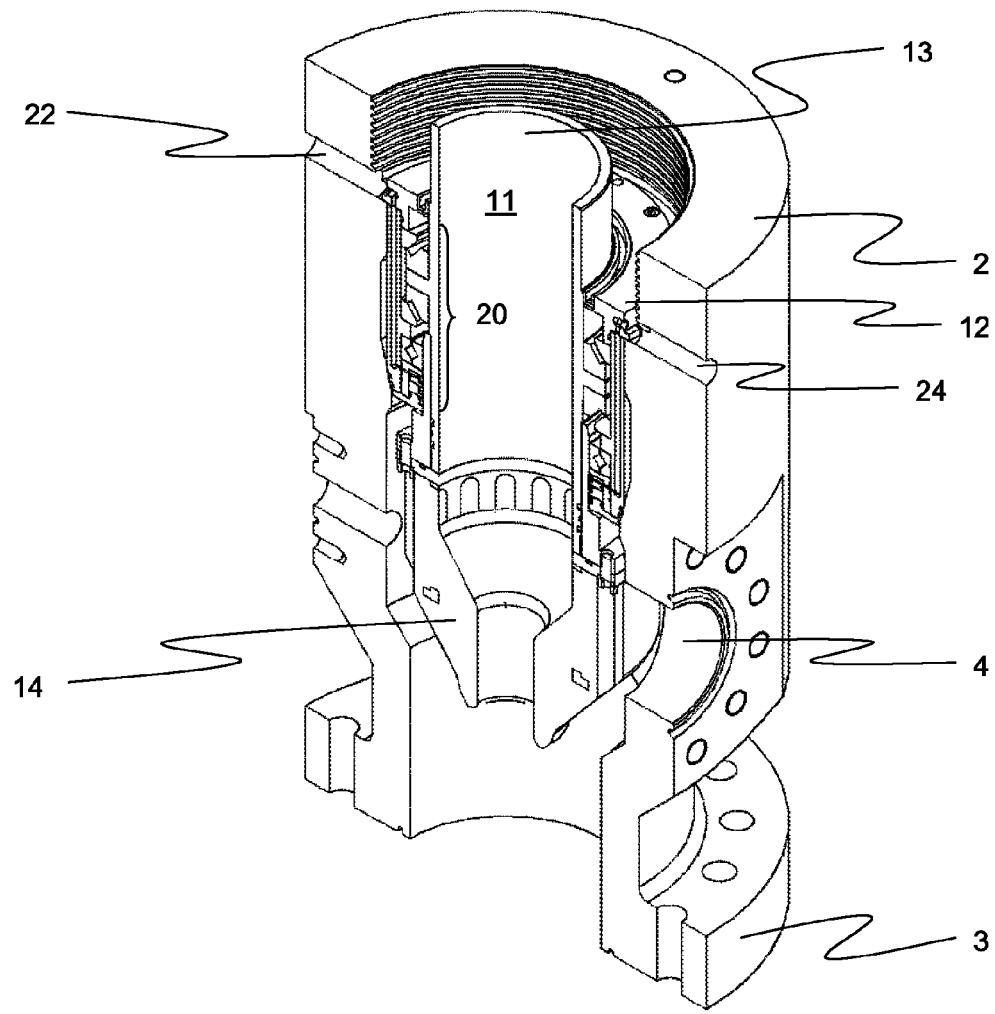
FIG. 3 is cross-sectional perspective view of an embodiment of the present invention illustrating the stationary housing, the internal assembly and stripper element—omitting the retaining cap—the cross section illustrating an inlet and an outlet, two lubricant passageways for an upper sealing element of a seal assembly.

Further still, in another embodiment, a circulation pump can be operatively connected to the corresponding inlet and outlet of the bearing elements 21a, 21b, 21c to form a closed loop circulation system for continuously flowing lubricant through the bearing elements 21a, 21b, 21c. In one embodiment, apertures 22 and 24 may be provided in order to facilitate access to the inlet and outlet, as illustrated by FIG. 3. In one embodiment, the apertures may be used to connect a circulation pump or other suitable device. The flowing lubricant cools and lubricates the bearing elements 21a, 21b, 21c. Cooling of the bearing elements 21a, 21b, 21c provides a general cooling effect to the surrounding structure which is beneficial to other components such as the sealing elements 41a, 41b, 41c.

The independency of the bearing and seal interfaces with each other and the independency of their corresponding lubricant passageway allows for differing conditions to be maintained across each interface, allowing for an operator to select the optimal levels of differential pressure across each sealing element and the circulating rate of the lubricant for each seal interface to achieve longer sealing element life.

With reference to FIGS. 8A and 8B, an exemplary sealing element is an elastomeric seal, such as a two part, low friction multi-lip elastomeric seal, which the Applicant has successfully designed and commissioned Hi-Tech Seals, Inc., of Calgary, Alberta, Canada to manufacture and supply. Each sealing element 41a, 41b, 41c remains stationary, supported in the seal sleeve 45 which is supported in the outer bearing housing 15 which is in turn supported by stationary housing 2 while maintaining a seal against the rotatable tubular shaft 13 of the quill 11.

As shown, this two part multi-lip seal used for seal elements 41a, 41b and 41c, comprises a body 50 and a loading ring 51. The body 50 comprises an outer peripheral wall 55 supported in the outer bearing housing 15, an annular cavity 56, and an inner sealing surface 53 adapted to engage tubulars, the inner sealing surface 53 having a plurality of individual sealing lips. Four sealing lips 52a, 52b, 52c, 52d are illustrated for sealing against the rotatable quill shaft 13 (shown in FIGS. 9A, 9B, and 10). The loading ring 51 has a greater cross-sectional width than that of the annular cavity 56. The loading ring 51, compressionally fits within the annular cavity 56, applying a radial force to urge the body 50 to expand radially inwardly to engage the inner sealing surface 53 with the quill's tubular shaft 13.

The loading ring 51 can also be formed with a radially inwardly extending shoulder 54 at a downhole end of the loading ring 51 for forming an additional, and fifth, individual sealing lip 52e that seals against the rotating quill shaft 13 when it is positioned within the outer ring 50. Sealing lip 52e is the first of the five sealing lips to contact wellbore fluids under pressure.

Figure 9A:
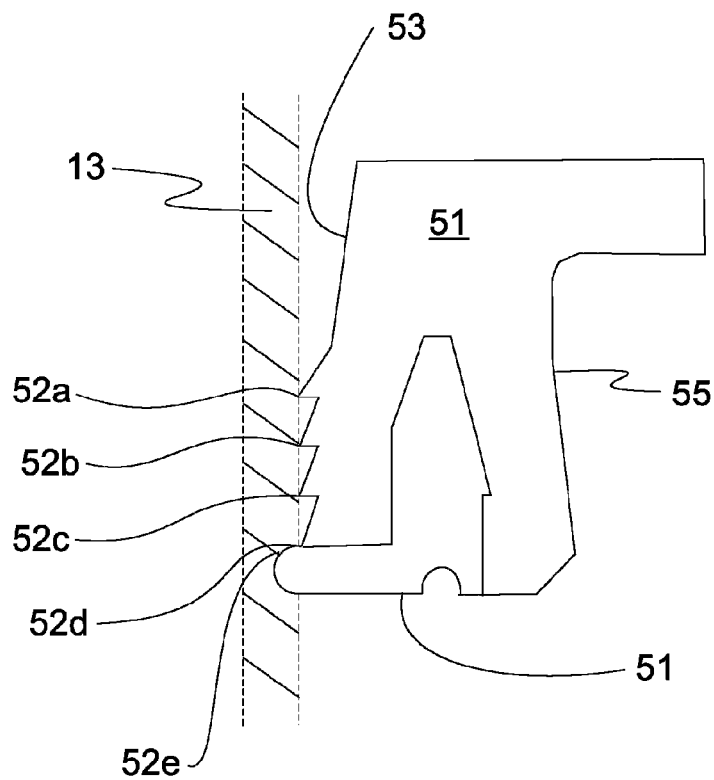
FIG. 9A is a cross sectional view of an embodiment of the present invention illustrating the sealing lips sealing against a hypothetical quill shaft.
Figure 9B:
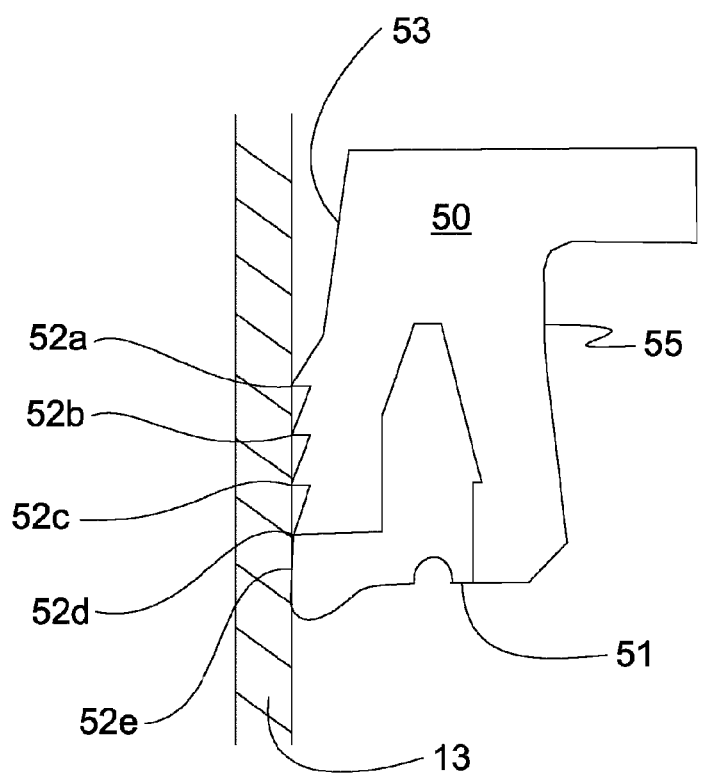
FIG. 9B is a cross sectional view of an embodiment of the present invention illustrating how the staged sealing lips sealingly compress against a quill shaft.
Figure 10:
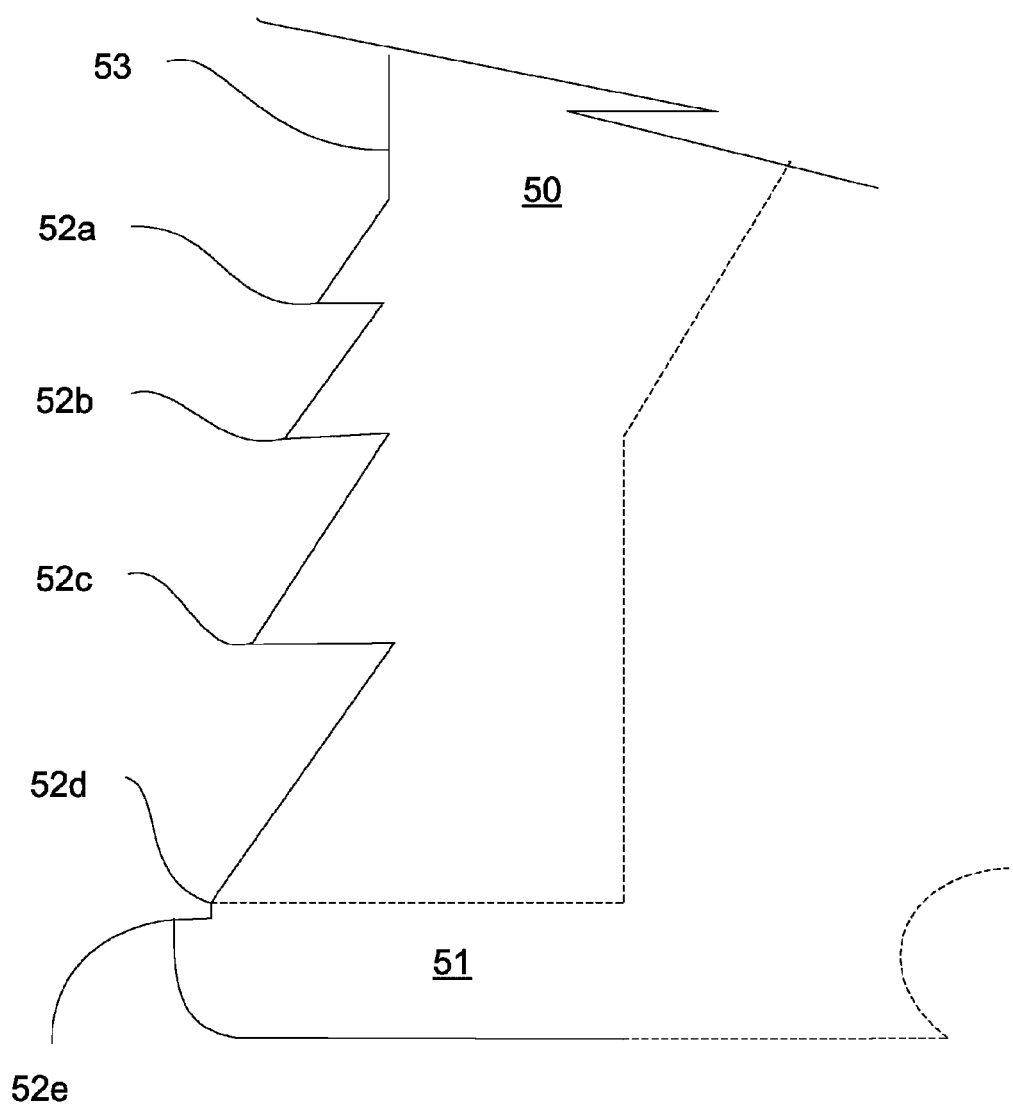
FIG. 10 is an exploded cross sectional view of an embodiment of the present invention illustrating how the sealing lips have progressively larger diameters as one goes from the lowermost sealing lip to the uppermost sealing lip.

In one embodiment, as shown diagrammatically in FIGS. 9A, 9B, and 10, the diameter of the sealing lips 52a-52e are staged, being progressively larger in diameter as the sealing lips are spaced farther away from the wellbore fluids. That is, the closest sealing lip 52e to the wellbore fluids is of a diameter that is sufficient to seal against the quill shaft 13, forming an initial wellbore fluid seal. Sealing lip 52e, having the smallest diameter, seals tighter against the quill shaft 13 than one or more sealing lips 52a-52d uphole. The diameters of the remaining sealing lips 52a, 52b, 52c, 52d can be sized progressively larger the farther they are spaced away from the wellbore fluids, but remain of a sufficient diameter to still maintain a seal against the quill shaft 13.

For example, in the embodiment shown in FIGS. 9A, 9B, and 10, the fifth sealing lip 52e, and the closest sealing lip to the wellbore fluids, has an inner diameter of about 230 mm. Sealing lip 52d, the second lowermost sealing lip, can have a diameter of about 0.1 mm larger that the diameter of sealing lip 52e. The remaining sealing lips 52a, 52b, 52c can similarly have diameters that are 0.1 mm or so larger than the preceding sealing lip. Each sealing lip 52a-52e remains in sealing contact with the quill shaft 13. However, the lowermost sealing lip 52e, and thus the sealing lip with the smallest diameter is more radially compressed against the quill shaft 13, thus forming a tighter seal.

The loading ring 51 provides a radially inwardly force against the body 50, urging the sealing lips 52a-52e to displace radially inwardly.

The body 50 can be composed of 25% carbon graphite polytetrafluoroethylene (PTFE). The loading ring 51 can be of synthetic rubber such as nitrile or Viton® (DuPont). The softer loading ring 51 provides a consistent radially inwardly force sufficient to urge the body 50 to seal against the rotating quill shaft 13 while prolonging the life of the sealing element. Applicant also believes that fluid pressure at the downhole face of the seal can cause the loading ring 51 to compress axially and expand radially, displacing the lips 52a-52e radially inwardly, and further enhance the seal.

In operation, the rotation of the quill shaft 13 eventually wears sealing lip 52e. Applicant has observed and believes that sealing lip 52e wears, causing an end portion of the sealing lip 52e that is in contact with the quill shaft 13 to extrude towards sealing lip 52d. As sealing lip 52e wears, the extruded portions of sealing lip 52e collect at a point where sealing lip 52d contacts the rotating quill shaft 13. The extruded portions of sealing lip 52e aid sealing lip 52d to form a seal against wellbore fluids as sealing lip 52e progressively deteriorates.

Continued rotation of the quill shaft 13 causes similar wear of sealing lip 52d and the extrusion of an end portion of the sealing lip 52d towards sealing lip 52c. As sealing lip 52d deteriorates, the extruded portions of sealing lip 52d aid to seal against the quill shaft 13 with sealing lip 52c.

This process of sealing lip wear, extrusion, aiding of an adjacent seal, or mere staged reliance on each successive sealing lip against the quill shaft 13 continues until it reaches the uppermost sealing lip 52a. The wear of sealing lip 52a causes the eventual failure thereof and the individual sealing element 41a, allowing the wellbore fluids to affect the lowermost seal interface 30a.

As sealing element 41a deteriorates, there is more reliance on sealing element 41b to isolate the bearing elements 21 from the wellbore fluids under pressure.

In another embodiment, a seal interface pressure monitor (not shown) can be used to monitor the pressure at each of the seal interfaces 30a, 30b. With each successive failure of the sealing elements 41a, 41b, a corresponding increase in fluid pressure at the seal interfaces 30a, 30b should be observed, allowing an operator to identify each sealing element that has failed, and preemptively replace the sealed bearing assembly 20 before the failure of the last sealing element 41c and the introduction of wellbore fluids into the bearing assembly 21.

The embodiments of the invention for which an exclusive property or privilege is claimed are defined as follows:

1. A rotating flow diverter having a sealed bearing assembly adapted for sealing one or more bearings from wellbore fluid under pressure, the rotating flow diverter comprising:
   an outer housing and an inner tubular adapted for the passage of an additional tubular therethrough, said inner tubular axially rotatable in said outer housing and forming an annular space therebetween; and
   a sealed bearing assembly disposed in the annular space and having one or more bearing elements arranged and designed to radially and axially support said inner tubular within said outer housing, the one or more bearing elements in fluid communication with a lubricant under pressure;
   said sealed bearing assembly also having a seal assembly positioned downhole from said one or more bearing elements and arranged and designed to isolate said one or more bearing elements from the wellbore fluid, said seal assembly having at least two sealing elements with a seal interface between each sealing element, said seal assembly further having a fluid passageway between said outer housing and each seal interface, wherein another lubricant is in fluid communication with each seal interface.

2. The rotating flow diverter of claim 1, wherein said outer housing further comprises at least one channel in fluid communication with each fluid passageway for flushing each seal interface with the another lubricant.

3. The rotating flow diverter of claim 2, wherein said at least one channel further comprises a corresponding inlet and outlet.

4. The rotating flow diverter of claim 3, further comprising a circulation pump coupled to said inlet and said outlet and forming a closed loop circulation system for lubricating each seal interface.

5. The rotating flow diverter of claim 1, wherein a downhole surface of at least one of said at least two sealing elements is a wellbore interface.

6. The rotating flow diverter of claim 1, further comprising at least one pressure monitor arranged and designed to monitor seal interface pressure.

7. The rotating flow diverter of claim 1, further comprising at least one heat exchanger for cooling at least a portion of the lubricant.

8. The rotating flow diverter of claim 1, further comprising a retaining cap for retaining said sealed bearing assembly within the outer housing.

9. A rotating flow diverter having a sealed bearing assembly adapted for sealing one or more bearings from wellbore fluid under pressure, the rotating flow diverter comprising:
   an outer housing and an inner tubular adapted for the passage of another tubular therethrough, said inner tubular axially rotatable in said outer housing and forming an annular space therebetween; and
   a sealed bearing assembly disposed in the annular space and having one or more bearing elements arranged and designed to radially and axially support said inner tubular within said outer housing, the one or more bearing elements in fluid communication with a first lubricant under pressure;
   said sealed bearing assembly also having a seal assembly positioned downhole from said one or more bearing elements and arranged and designed to isolate said one or more bearing elements from the wellbore fluid, said seal assembly having at least two sealing elements with a seal interface disposed between each sealing element, said seal assembly further having a fluid passageway between said outer housing and each seal interface, wherein a second lubricant is in fluid communication with each seal interface; and
   wherein at least a portion of each of said at least two sealing elements are supported by a corresponding backer ring.

10. The rotary flow diverter of claim 9, wherein said seal interface is disposed between one of said at least two sealing elements and said corresponding backer ring positioned downhole of said one of said at least two sealing elements.

11. The rotary flow diverter of claim 9, wherein the pressure of said first lubricant is less than or equal to wellbore fluid pressure and greater than or equal to atmospheric pressure.

12. The rotary flow diverter of claim 9, wherein fluid passageways between said outer housing and a plurality of seal interfaces are independent of each other.

13. The rotary flow diverter of claim 9, wherein said second lubricant is under pressure.

14. The rotary flow diverter of claim 13, wherein the pressure of said second lubricant is substantially equal to the pressure of said first lubricant.

15. The rotary flow diverter of claim 9, wherein said outer housing further comprises a corresponding inlet and outlet in fluid communication with each fluid passageway for flushing each seal interface with said second lubricant.

16. The rotary flow diverter of claim 15, wherein said inlet and said outlet are interchangeable.

17. A sealed bearing assembly for a rotating flow diverter, the sealed bearing assembly adapted for sealing one or more bearings from a wellbore fluid under pressure, the sealed bearing assembly comprising:
   one or more bearing elements disposed in an annular bearing assembly space, said annular bearing assembly space formed between an outer housing and an inner tubular configured for the passage of another tubular therethrough, said one or more bearing elements arranged and designed to radially and axially support and permit axial rotation of said inner tubular within said outer housing, said one or more bearing elements having exposure to a lubricant under pressure;
   a seal assembly disposed in the annular bearing assembly space downhole from said one or more bearing elements and arranged and designed to isolate said one or more bearing elements from the wellbore fluid, said seal assembly including at least one sealing element, said at least one sealing element having:
      an elastomeric body configured with an outer peripheral wall supported by
      said outer housing, an inner sealing surface adapted to engage said inner tubular, and an annular cavity;
      wherein said elastomeric body is composed of about 25% carbon graphite polytetrafluoroethylene; and
   an elastomeric loading ring composed of synthetic rubber for compressible fitting within the annular cavity and for providing a radial force to urge said elastomeric body to expand radially inwardly to engage its inner sealing surface with said inner tubular for sealing therewith.

* * * * *